(12) United States Patent
Langlais

(10) Patent No.: US 10,967,716 B2
(45) Date of Patent: Apr. 6, 2021

(54) CONVERTIBLE TOP HAVING TWO LINKS CONNECTED TO EACH OTHER VIA A COUPLING LINK

(71) Applicant: Webasto SE, Stockdorf (DE)

(72) Inventor: Cédric Langlais, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 18 days.

(21) Appl. No.: 16/437,590

(22) Filed: Jun. 11, 2019

(65) Prior Publication Data

US 2019/0389290 A1    Dec. 26, 2019

(30) Foreign Application Priority Data

Jun. 20, 2018 (DE) .......................... 102018114807.0

(51) Int. Cl.
*B60J 7/12* (2006.01)

(52) U.S. Cl.
CPC .................................. *B60J 7/1265* (2013.01)

(58) Field of Classification Search
CPC ...... B60J 7/1265; B60J 7/1269; B60J 7/1273; B60J 7/1278; B60J 7/1282
USPC ............ 296/120.1, 121, 122, 107.09, 107.16
See application file for complete search history.

(56) References Cited

U.S. PATENT DOCUMENTS

| 7,021,696 B2 * | 4/2006 | Doncov | ................. | B60J 7/1851 292/DIG. 5 |
| 7,093,884 B2 * | 8/2006 | Eichhorst | ............... | B60J 7/0573 296/105 |
| 7,837,250 B2 * | 11/2010 | Matsui | ..................... | B60J 7/198 296/120.1 |

FOREIGN PATENT DOCUMENTS

DE          10053236 A1   5/2002
DE       102007059574 A1   6/2009

\* cited by examiner

*Primary Examiner* — Dennis H Pedder
(74) *Attorney, Agent, or Firm* — Fitch, Even Tabin & Flannery LLP

(57) ABSTRACT

A convertible top linkage which is displaceable between a closed and position, and having a link assembly on either side of a vertical longitudinal center plane of the top, each link assembly having a first and second link, the first link and the second link being pivotable relative to a common base and connected to each other via a coupling link which is hinged to the first link via a fixed joint and to the second link via a mobile joint. The second link may have a guide track for a guiding element of the coupling link, the guide track keeping the mobile joint in position relative to the second link when the two links are being pivoted in a defined angle range, the mobile joint being shifted relative to the second link when the two links are being pivoted outside of the defined angle range.

9 Claims, 2 Drawing Sheets

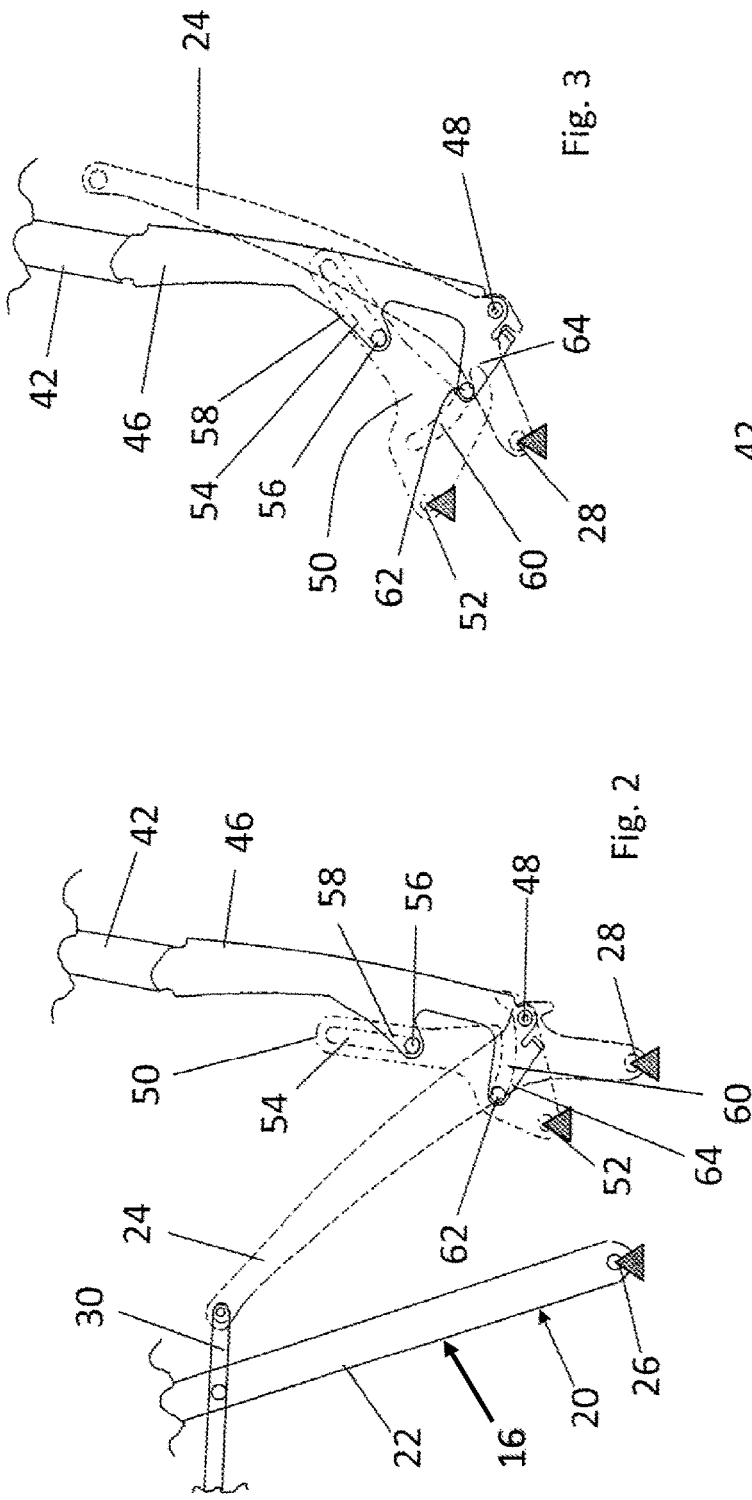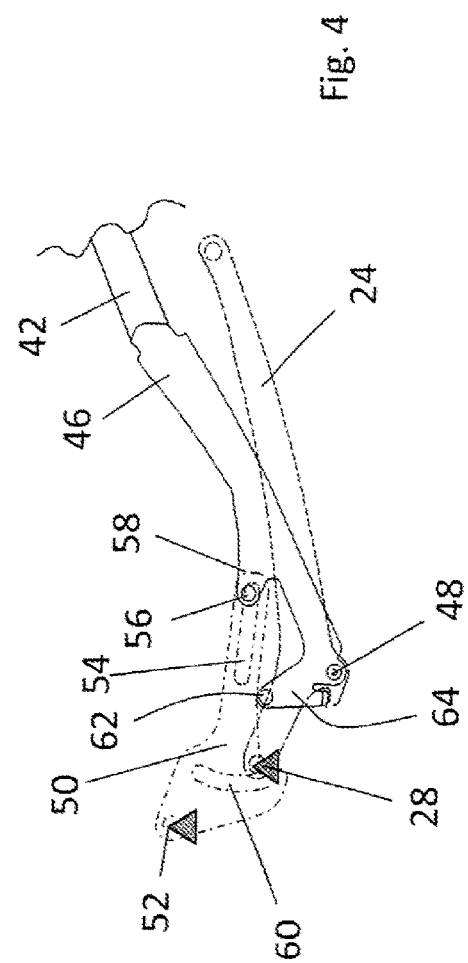

CONVERTIBLE TOP HAVING TWO LINKS CONNECTED TO EACH OTHER VIA A COUPLING LINK

CROSS-REFERENCE TO RELATED APPLICATION

This application claims priority from German Patent Application Number DE 10 2018 114 807.0, filed Jun. 20, 2018, which is hereby incorporated herein by reference in its entirety for all purposes.

The invention relates to a top for a convertible vehicle.

A top of this kind is known from practice and comprises a top linkage which is displaceable between a closed position, in which a vehicle interior is covered, and a storage position, in which the vehicle interior is uncovered. The top linkage of the known top has a link assembly on either side of a vertical longitudinal center plane of the top. Each link assembly has a bow link which is linked to a corner bow connecting the two link assemblies and which forms a coupling or connecting link between a main link, which is mounted on a vehicle-attached main bearing and forms part of a main multi-joint linkage of the link assembly, and an additional link, which is also pivotably mounted on the main bearing. The connecting link, which forms the coupling link, is pivotably mounted on the main link via a fixed pivot point. The coupling link is linked to the additional link via a pin which has flattened portions on opposite sides and which engages into an oblong hole of the additional link, the oblong hole being widened at one end. The widened portion has a diameter that corresponds to the length of the pin. The other parts of the oblong hole have a width that corresponds to the width of the pin in the area of the flattened portions. Thus, a mobile joint is realized in which the pin can turn in the widened portion of the oblong hole and shift in the oblong hole when it has reached a specific turning position. As a result, when the top linkage is actuated starting from the closed position, the bow link pivots at first while the mobile joint, which is disposed in the area of the widened portion of the oblong hole, is fixed relative to the additional link. When the turning position in which the flattened portions are aligned parallel to the oblong hole has been reached, continued pivoting of the link assembly or of the main link and of the additional link causes the mobile joint to shift in the oblong hole. The forces that act on the flattened pin are very strong, especially at the point at which the pin switches from turning to sliding, which means that wear is extensive and the risk of damage to the pin is very high.

The object of the invention is to provide a top of the kind mentioned above in which the risk of damage to the mobile joint is minimized.

According to the invention, this object is attained by the top having the features of claim 1.

The top according to the invention has a link assembly comprising two links which are pivotable relative to a common base and connected to each other via a coupling link. One of the hinge points of the coupling link is formed by a fixed joint which is defined by a fixed axis of rotation between the coupling link and the respective link. The coupling link is linked to the other link via a mobile joint, i.e. a joint whose pivot axis can shift on the respective link, in particular. The guide track, in which a guiding element of the coupling link is guided, blocks shifting of the mobile joint on the second link. Said shifting is not possible until the guiding element leaves the guide track or a guide track section. When it does, the pivot axis of the mobile joint can shift on the second link. When the mobile joint is blocked, forces coming from the coupling link are thus introduced into the second link via two bearing points, namely via the guiding element guided in the guide track on the one hand and via the mobile joint on the other hand. The switch between the turning in the area of the mobile joint and the shifting of the mobile joint is independent of the guiding of the mobile joint on the second link, which is why any stress at the bearing points is independent of tolerances and external mechanical forces.

In a specific embodiment of the top according to the invention, the guide track has an open end, the guiding element of the coupling link thus being located outside of the guide track when the two links are being pivoted outside of the defined angle range. Of course, it is also conceivable that the guide track which blocks shifting of the mobile joint forms a section of a guide track so that the guiding element is also guided outside of the defined angle range in which shifting of the mobile joint is blocked.

Advantageously, the guide track has a circular-arc shape which is concentric with respect to an initial position of the mobile joint or its axis. As long as the guiding element of the coupling link moves in the guide track having the circular-arc shape, the position of the mobile joint, which corresponds to the initial position of the mobile joint, is clearly defined.

In an embodiment of the top according to the invention that is constructively simple to implement, the mobile joint comprises a pin which engages into an oblong hole of the second link. The pin and the second link or the portion of the second link that forms the oblong hole advantageously consist of a material combination that allows low-friction sliding of the pin in the oblong hole.

In an advantageous embodiment of the top according to the invention, the coupling link is locked in an initial position. To this end, the pivot points of the links are designed in such a manner that the fixed joint is in an over-dead-center position with respect to a connecting line between the mobile joint and a joint of the second link at the base when in the initial position.

In a specific embodiment of the top according to the invention, the first link or the second link is a main link of a main multi-joint linkage of the respective link assembly.

The coupling link is a bow link, for example, in particular a corner bow link via which the bow or corner bow or a panel bow can be shifted when the top linkage is being displaced.

The base to which the two links are hinged is formed by a vehicle-attached main bearing, for example.

In particular, the top according to the invention is a folding top comprising conventional transverse bows, but it can also be what is known as a panel-bow top, in which multiple plate-like panel bows are provided, said panel bows being disposed one behind the other in the longitudinal direction of the vehicle and forming a support surface for a top cover when then top is in the closed position and being stacked in a top storage space when the top is in the storage position. It is also conceivable that the top according to the invention is a retractable hard top.

Other advantages and advantageous embodiments of the subject-matter of the invention are apparent from the description, the drawings and the claims.

An embodiment of a top according to the invention is illustrated in a schematically simplified manner in the drawing and will be explained in more detail in the following description.

FIG. 2 shows a rear section of a link assembly of a top linkage of the top in the closed position;

Figure 1:
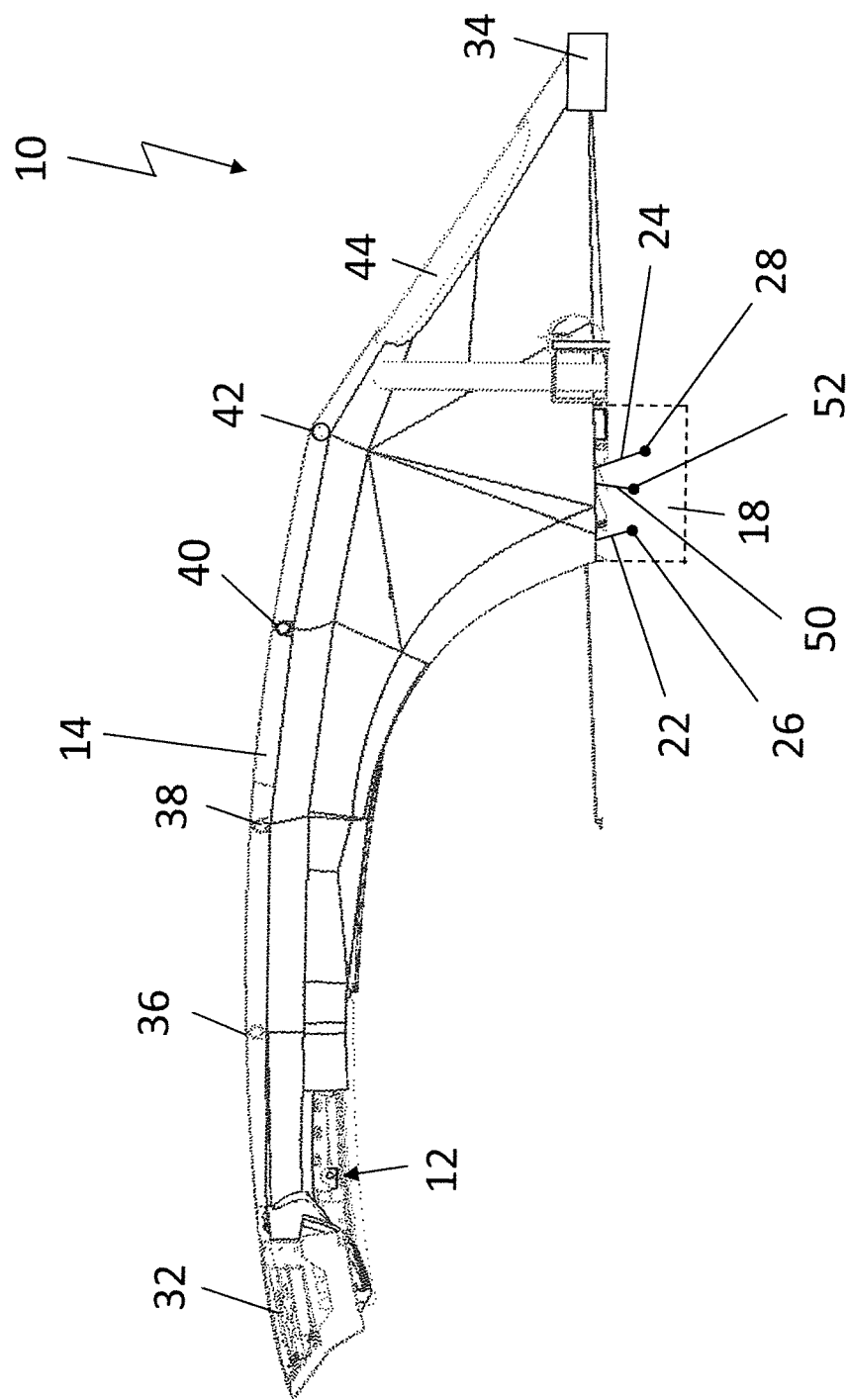
FIG. 1 shows a schematic side view of a top according to the invention.

FIG. 3 corresponds to FIG. 2 and shows the link assembly in an intermediate position without illustration of a main pillar; and FIG. 4 corresponds to FIG. 3 and shows the link assembly in a storage position of the top linkage.

The drawing shoes a folding top 10 of a motor vehicle (not shown) which is a convertible vehicle. Folding top 10 is selectively displaceable between a closed position (FIG. 1), in which a vehicle interior of the motor vehicle is covered, and a storage position (FIG. 4), in which the top is accommodated in a top storage box disposed to the rear of the vehicle interior and the vehicle interior is uncovered. For being displaced, folding top 10 has a top linkage 12 which serves to extend a top cover 14 made of a foldable textile material. As is common, top cover 14 can comprise a weatherproof outer skin and an inner skin which forms a headliner of the vehicle interior when in the closed position.

Top linkage 12 has a link assembly 16 on either side of a vertical longitudinal center plane of the top, which extends in the longitudinal direction of the vehicle, each link assembly 16 being pivotably mounted on a main bearing 18 disposed in the area of the top storage box of the vehicle.

For the sake of clarity, the drawing shows only the link assembly disposed on the left with respect to the forward direction of travel of the motor vehicle. The link assembly disposed on the right with respect to the forward direction of travel of the motor vehicle is symmetrical thereto and is readily apparent from the following description.

Bilaterally disposed link assemblies 16 each have a main four-joint linkage 20 comprising two main links 22 and 24. Main link 22, which is illustrated in FIG. 2 only, forms what is known as a main pillar, on which a side weather strip is disposed and which is pivotably mounted on main bearing 18 via a hinge point 26. Main link 24 is pivotably mounted on main bearing 18 via a hinge point 28. In their end portions facing away from main bearing 18, the two main links 22 and 24 are pivotably connected to a roof link 30. Furthermore, a drive device (not shown) which acts on one of main links 22 and 24 and forms a drive motor of folding top 10 is disposed on main bearing 18.

As can be seen from FIG. 1, in particular, top linkage 12 comprises a front bow 32 via which folding top 10 can be fixed to a front header (not shown) of the motor vehicle. Front bow 30 defines top cover 14 at the front end. At the rear, top cover 14 is defined by a tensioning bow 34 which has an arc shape and which is connected to one of link assemblies 16 of top linkage 12 at either side.

Between front bow 32 and tensioning bow 34, top linkage 12 has other transverse bows 36, 38, 40 and 42, which connect bilaterally disposed link assemblies 16 and extend in the transverse direction of the vehicle. Transverse bows 36 serve to keep top cover 14 under tension when in the unfolded state, i.e. when folding top 10 is in the closed position. Transverse bow 42 forms what is known as a corner bow, which separates a roof portion disposed above the vehicle interior from a rear window portion, in which a rear window 44 is provided.

At each of its two ends, corner bow 42 is connected to a corner bow link 46 which is pivotably mounted on main link 24 via a pivot point 48. To control the pivoting behavior of corner bow link 46 relative to main link 24, link assembly 16 has an additional link 50 which is pivotably mounted on main bearing 18 via a hinge point 52. Additional link 50 has an oblong hole 54 in which a pin 56 is arranged, pin 56 being disposed on a protrusion 58 of corner bow link 46 in an area between corner bow 42 and pivot point 48. Pin 56 has a diameter that corresponds to the width of oblong hole 54.

In an area disposed between oblong hole 54 and hinge point 52, additional link 50 has a guide track 60 which has an arc shape that is concentric with pin 56 when pin 56 is in its initial position in oblong hole 54 as illustrated in FIGS. 2 and 3. This initial position corresponds to a final position of pin 56 at the end of oblong hole 54 that faces hinge point 52. Guide track 60 is open at the rear with respect to the closed position of top linkage 12 and the vehicle orientation and serves to guide a pin-like guiding element 62 which is formed on another protrusion 64 of corner bow link 46. Protrusion 64 is disposed on corner bow link 46 at the level of pivot point 48.

Main link 24, which is mounted in hinge point 28 on main bearing 18, additional link 50, which is mounted in hinge point 52 on main bearing 18, and corner bow link 46, which is mounted on main link 24 in pivot point 48, which forms a fixed joint, and mounted on additional link 50 via pin 56, form a four-joint linkage, a mobile joint being realized by pin 56 disposed in oblong hole 54. Main link 24 forms a first link of the four-joint linkage, additional link 50 forms a second link of the four-joint linkage, and corner bow link 46 forms a coupling link or connecting link of the four-joint linkage.

The assembly illustrated in FIGS. 2 to 4 works in the way described below.

Starting from the initial position (FIG. 2), which is associated with the closed position of top linkage 12, the main four-joint linkage comprising main links 22 and 24 is pivoted in the clockwise direction with respect to the view selected in the drawing. In doing so, the four-joint linkage composed of main link 24, additional link 50 and coupling link 46 is also pivoted about hinge points 28 and 52. Since guiding element 62 is disposed in guide track 60, pin 56 blocked in oblong hole 54 forms a fixed pivot point. Once the four-joint linkage has been pivoted about a defined angle and corner bow link 46 has thus executed a pivoting movement relative to main link 24 and additional link 50 by design of the four-joint linkage, guiding element 62 leaves guide track 60. This frees pin 56 to shift in oblong hole 54. Thus, as main link 24 continues to pivot in the clockwise sense into the storage position illustrated in FIG. 4, pin 56 is moved in oblong hole 54 and corner bow link 46 is shifted relative to additional link 50.

When top linkage 12 is being displaced from the storage position into the closed position, the sequence of motions within the four-joint linkage composed of main link 24, additional link 50 and corner bow link 46 is reversed, which means that corner bow link 46 is displaced relative to additional link 50 at first until guiding element 62 enters guide track 60 and pin 56 has arrived in its initial position. Then, guiding element 62 is moved in guide track 60 while pin 56 is kept in position in oblong hole 54.

Reference Signs 10 folding top
12 top linkage
14 top cover
16 link assembly
18 main bearing
20 main four-joint linkage
22 main link
24 main link
26 hinge point
28 hinge point 30 roof link
32 front bow
34 tensioning bow
36 transverse bow
38 transverse bow
40 transverse bow
42 transverse bow
44 rear window
46 corner bow link
48 pivot point
50 additional link
52 hinge point
54 oblong hole
56 pin
58 protrusion
60 guide track
62 guiding element
64 protrusion

The invention claimed is:

1. A top for a convertible vehicle, the top comprising:
a top linkage which is displaceable between a closed position, in which a vehicle interior is covered, and a storage position, in which the vehicle interior is uncovered, and which has a link assembly on either side of a vertical longitudinal center plane of the top, each link assembly comprising a first link and a second link, the first link and the second link being pivotable relative to a common base and connected to each other via a coupling link which is hinged to the first link via a fixed joint and to the second link via a mobile joint, wherein the second link comprises a guide track for a guiding element of the coupling link, the guide track keeping the mobile joint in position relative to the second link when the two links are being pivoted in a defined angle range, the mobile joint being shifted relative to the second link when the two links are being pivoted outside of the defined angle range.

2. The top according to claim 1, wherein the guide track has an open end, the guiding element of the coupling link thus being located outside of the guide track when the two links are being pivoted outside of the defined angle range.

3. The top according to claim 1, wherein the guide track has a circular-arc shape which is concentric with respect to an initial position of the mobile joint.

4. The top according to claim 1, wherein the mobile joint comprises a pin which engages into an oblong hole of the second link.

5. The top according to claim 1, wherein the fixed joint is in an over-dead-center position with respect to a connecting line between the mobile joint and a joint of the second link at the base when the top linkage is in the closed position.

6. The top according to claim 1, wherein the first link is a main link of a main multi joint linkage of the respective link assembly.

7. The top according to claim 1, wherein the coupling link is a corner bow link.

8. The top according to claim 1, wherein the base is formed by a vehicle-attached main bearing.

9. The top according to claim 1, wherein the top is a folding top.

* * * * *